(12) United States Patent
Martin et al.

(10) Patent No.: US 10,101,223 B2
(45) Date of Patent: Oct. 16, 2018

(54) SMART LOAD PIN FOR DRAW-WORKS

(71) Applicant: Transocean Sedco Forex Ventures Limited, George Town Grand Cayman (KY)

(72) Inventors: Trenton Martin, Kingwood, TX (US); Steven McLemore, Pearland, TX (US); Rafik Ishak Stefanos, Houston, TX (US)

( * ) Notice: Subject to any disclaimer, the term of this patent is extended or adjusted under 35 U.S.C. 154(b) by 0 days.

(21) Appl. No.: 15/051,333

(22) Filed: Feb. 23, 2016

(65) Prior Publication Data

US 2016/0245727 A1 Aug. 25, 2016

Related U.S. Application Data

(60) Provisional application No. 62/119,397, filed on Feb. 23, 2015.

(51) Int. Cl.
*G01L 1/22* (2006.01)
*G01L 5/00* (2006.01)

(52) U.S. Cl.
CPC ............ *G01L 1/225* (2013.01); *G01L 1/2281* (2013.01); *G01L 5/0004* (2013.01)

(58) Field of Classification Search
CPC .............................. G01L 1/225; G01L 1/2281
USPC ...................................................... 73/862.56
See application file for complete search history.

(56) References Cited

U.S. PATENT DOCUMENTS

| 2005/0150689 | A1 | 7/2005 | Jogi et al. | |
| 2005/0230149 | A1* | 10/2005 | Boucher | E21B 47/12 175/48 |
| 2011/0290559 | A1* | 12/2011 | Rodney | E21B 47/12 175/24 |
| 2013/0120154 | A1* | 5/2013 | Gleitman | E21B 17/003 340/854.4 |

FOREIGN PATENT DOCUMENTS

EP  0971216 A2  1/2000

OTHER PUBLICATIONS

Australian Examination Report dated Aug. 29, 2018 for Australian Application No. 2016222867.

* cited by examiner

*Primary Examiner* — Lisa Caputo
*Assistant Examiner* — Jamel Williams (57) ABSTRACT

A smart load pin may be configured to measure a load on a hook of a draw-works system. The smart load pin may also include circuitry to convert the measured load to a digital value representative of the measured load, wherein the digital value represents the value of the measured load in engineering units and to transfer the digital value representative of the measured load to a control system located at a derrick. The data from the smart load pin may be used in adjusting, with a control system, operation of the draw-works system based, at least in part, on the received digital value representative of the measured load.

17 Claims, 6 Drawing Sheets

SMART LOAD PIN FOR DRAW-WORKS

CROSS-REFERENCE TO RELATED PATENT APPLICATIONS

This patent application claims the benefit of priority of U.S. Provisional Patent Application No. 62/119,397 to Martin et al. filed on Feb. 23, 2015 and entitled "Intelligent Load Pin for Draw-works," which is incorporated by reference herein.

FIELD OF THE DISCLOSURE

This disclosure relates to equipment used for drilling operations in oil and gas wells. More specifically, this disclosure relates to a method for measuring the load on the hook of a draw-works in an intelligent manner.

BACKGROUND

Figure 1:
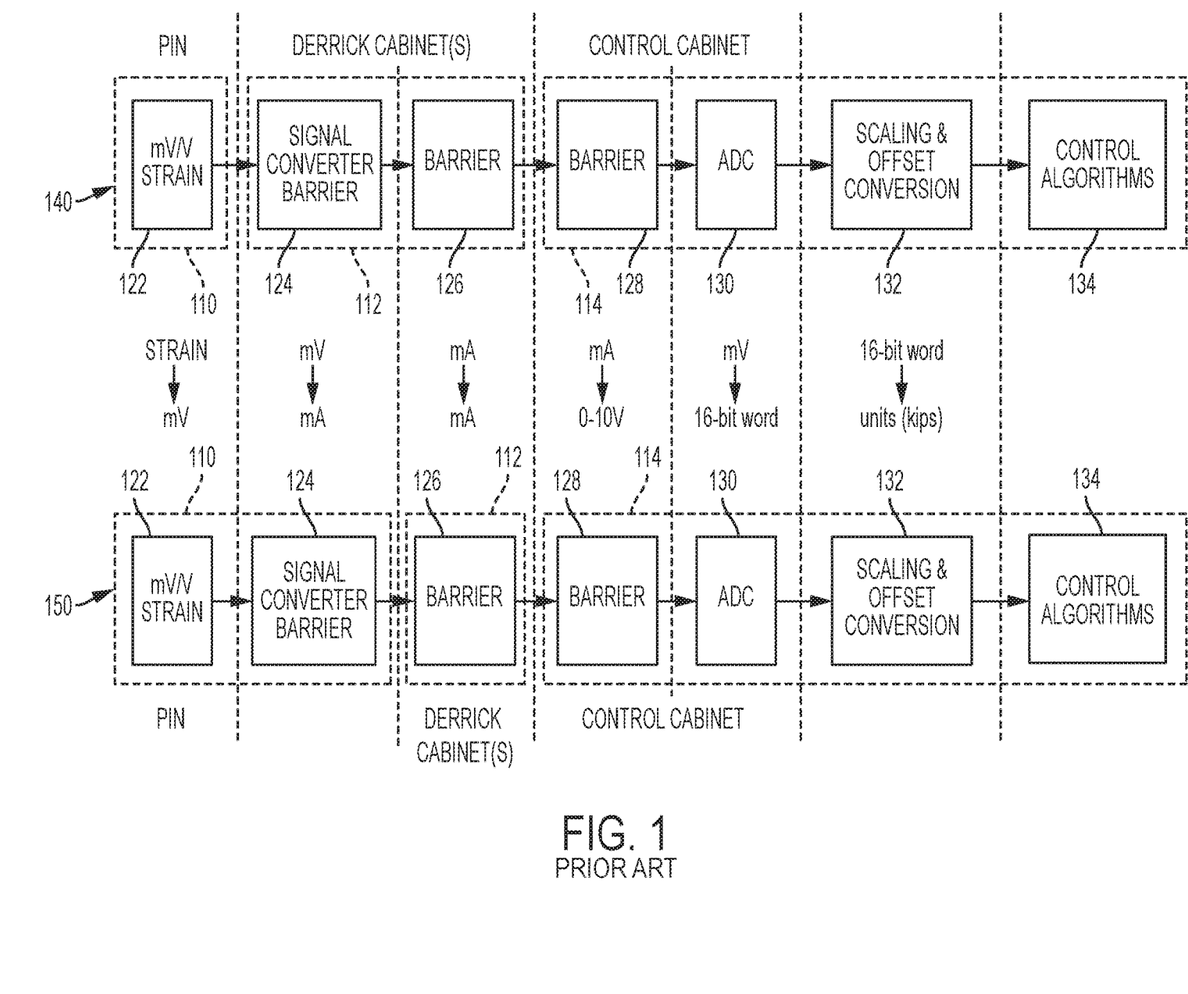
FIG. 1 is a block diagram illustrating conventional paths and processing steps for the hookload signal from the measurement to the control system according to the prior art.

Conventional methods of measuring and reporting hookload has not changed significantly since 1926. One significant change in this field was the shift from using a diaphragm-type weight indicator to a strain cell integrated with the load bearing pins. There have been some incremental improvements over time, but no significant changes since that time. One problem with the conventional strain measurements is the long communication path of the strain measurement before conversion to engineering units. Each component in the path creates a new source for noise and a new possible entry point for error until the data is in engineering units. FIG. 1 is a block diagram illustrating conventional paths and processing steps for the hookload signal from the measurement to the control system according to the prior art. In particular, FIG. 1 illustrates two processing paths 140 and 150. Both of the paths 140 and 150 include similar equipment (sensor 122, converter 124, barrier 126, barrier 128, converter 130, scaler 132, and controller 134) arranged differently in a pin 110, derrick cabinet(s) 112, and control cabinet 114. Each of the equipment is arranged to convert the measured strain into a final engineering unit measurement (such as kips).

FIG. 1 illustrates different process flow of the signal for the hookload measurement derived from transducer to HMI display. The strain gauge in the pin outputs a millivolt signal that is accepted in to an intrinsically safe barrier. The barrier then converts this millivolt signal to a milliamp signal, then drives the signal from the field station (e.g., junction box) to a control cabinet. Inside the control cabinet, a control system will either accept the current signal or, in some cases, present this signal to another intrinsically safe barrier that converts the signal into a 0 to 10 Volt signal, terminated into an analog input on the control system I/O device. This signal now represents the minimum and maximum output of the original strain gage. The PLC is given instruction to place a "real world" value to measure load commonly represented in Tons or kips. An analog/digital (A/D) converter in the PLC assigns a value to present data to the user based on an formula, which takes a known min and max value and creates a slope based on the difference between the delta. In short, a real world value is displayed to the user based on the amount of force applied to strain gauge.

Conventional hook load measurement is currently derived from a few different methods, including: load cells installed in pins connecting the topdrive to the travelling block, load cells installed in pins on the crown block, load cells installed in the deadline, and Strain measurement sensors installed on the Steel Wire Rope (SWR). The first three methods involve property of the drilling contractor, whereas the fourth is installed by a third party mud logging service provider. The attractiveness to the fourth type of installation is that it does not depend on any rig-based instrumentation and can easily be installed without taking the block out of service. The downside is it is susceptible to breakage, dampening, and its accuracy is debatable.

The third method, in which the load measurement is from the deadline, has been a conventional method consisting of a stepdown piston and hydraulic hose connected directly to a mechanical gauge or to a pressure sensor that will convert to an electrical signal to be display. The strengths to this method include simplicity, ease of access and is simple to troubleshoot. The downsides are inherent dampening, lag, and overall accuracy concerns in the measurement as it is located very far away from the measurement point. Variations in WOB and HL can directly influence the control process as well as the drilling process.

The second method is an improvement on the third by placing the measurement location much closer to what is intended to be measured and removes the problems of a hydraulic circuit and pressure transducer by using a strain gauge sensor. One or more strain gauge sensors are located in each load bearing clevis pin required to lock the crown block in to its position. One conventional installation includes four load pins providing four load measurements. For an accurate measurement in a marine environment all four sensors need to be operational as the load distribution across the four pins is not expected to be homogenous.

During the manufacturing process, the strain gauge load cell is exposed to a full range of its intended loads on a hydraulic press. Also, incorporated into this press is a calibration load cell that is traceable back to NIST (National Institute of Standards and Technology). A calibration certification would accompany a load cell with two or more (typically around ten) calibration value pairs. As the strain gauge load cell does not natively output mA (current loop), a specialized signal conditioner (e.g. KFD2-WAC-Vx1d) is required. The strain measurement is accomplished by supplying an excitation voltage across two points on the Wheatstone bridge and then measuring the resultant voltage on the other side. The signal native to the strain cell is proportional to the excitation voltage and that variation of the measurement section's resistance. The signal units as a result are mV/V. The signal in this form cannot be used directly by a control system. The signal conditioner mentioned converts the mV/V measurement to a current loop signal (4-20 mA). This resultant signal can be used by the control system, however in order to use this signal and the factory calibration the strain gauge cell and the signal conditioner must always be connected and paired with the specific load cell in the circuit. The signal conditioner has 'zero' and 'span' adjustments (potentiometers or digitally configured), if these are adjusted in the field or a different conditioner is used it invalidates the factory calibration.

A deficiency sometimes seen in the industry during the installation process is that once the load cells are installed in the field, another effort of deriving the same coefficients is done but with roughly estimated loads. To accomplish this in-field calibration the field engineer would request the rig crew to apply the maximum load as possible to the hook. The load applied is approximate (unless a reference cell is available on board), normally the full range of the load cell cannot be fully realized offshore unless it is during operations. The issues with this method are: the reference load used will not be calibrated to a NIST or known standard; the load applied is not through the entire range; operation requires recalibration of draw-works when replacing a load cell or barrier; and the measurements are subject to field errors.

The obvious answer to the above problems is to use the original calibration. It is not clear why this is currently not always done. It can be speculated that it was used at one time, but if the measured and actual loads did not match the simplest solution in the field would have been to adjust the measurements to align with the test load on board the rig. This would then require an in-field 're-calibration' to be done. As mentioned above there are also load cells that are installed at the deadline. These load cells will be less accurate as they are farther away from the measurement point. If both the load pin and the deadline load cell are installed, to ensure the measurements can corroborate one another the friction losses in the system need to be accounted for. A simple model we typically used to estimate some of these loses is shown in the following equation:

$$\frac{[(e_{t-mech}^{N_l}) - 1]}{[(e_{t-mech}^{N_l})N_l(e_{t-mech} - 1)]} = e_{rev\_mech}$$

where $e_{t-mech}$=Tackle Efficiency=1.015; $N_1$=number of lines; $F_{hl}$=Hookload observed; $F_{fs}$=load on the fast line, where $F_{hl}=F_{fs}N_le_{rev-mech}$ The calculation above only addresses tackle efficiency, there will be other friction losses that will need to be accounted for. In 2012 Hookload was defined by U.MME with NTNU as "The sum of vertical components of the forces acting on the drillstring attached to the hook." There is expected to be other friction losses, even for the becket pin style load cell installation. It is expected that they are relatively small, but those losses should be quantified. The importance of the hookload measurement in the control system is that it executes configured responses based on certain deviations of hookload during various operations. If the hookload values are not reliable this poses a challenge to the user as the system may not respond in a predictable manner.

First, it is important to recognize that some system suppliers have termed the infield rescaling of the load measurement a calibration, despite it is in fact not a calibration. An infield re-scaling is not sufficient and as a result is introducing unnecessary error into the load measurement. It can be argued that this error is sufficiently significant such that it has contributed to the necessity for recalibrations of multiple installations in the past. During factory testing these load cells pass through a series of tests. The pin is put through its usable range and the manufacturer generates a table which maps the electrical signals from the pin's strain measurement circuit to a real work load. This mapping is accomplished with a degree of accuracy by using a NIST traceable load cell.

Conventionally, there can be two or more "calibrations" performed for the draw-works load cells. The first calibration occurs at the factory where a load cell is exposed to the range of forces. The measurement of these forces is done with a NIST (National Institute of Standards and Technology) traceable load cell that permanently resides at the factory. For a specific pin and the electrical signal, these forces are captured during the factory calibration process and provided as a table with the load cell's certificates. The second calibration that occurs once the load cell is installed on board the vessel is a field calibration using a field procedure. To summarize the procedure, it attempts to expose the load cell as fitted in the draw-works with estimated loads as opposed to known loads (e.g. NIST). Another drawback is the load cell is not exposed to its entire range, but only a faction. The loads experienced by the crown or travelling block pins will not be equal across all load cells. This is due to the load distribution the sheaves and asymmetric friction losses from the mechanical coupling. This inequality may have cause contention with the original design and it was established to institute a field calibration.

SUMMARY

Measuring the load at the traveling block can produce accurate results. The manner of the conversion from a millivolts (mV) signal produced by the sensor to engineering units for processing directly influences this accuracy. A system can be adapted for use with load pins, including conventional load pins, that provides improved conversion processes and increased accuracy. Such a system may include a "smart load pin."

The smart load pin may include one or more features, including: intelligent self-diagnostics, such that control software is able to detect a failure; having less external components required for it to operate; not requiring constant recalibration, such as by performing factory calibration in controlled conditions to a known standard; minimizing the hysteresis concavity error, which improves at least 1% accuracy full scale in hookload without introducing excessive complexity; including additional sensors integrated in the pin, such as accelerometers and rate gyros to provide more motion data about the pin and the topdrive itself; applying temperature compensation to measurements beyond that of the foil strain gauge design; communicating this information over a field bus protocol to facilitate reporting the loads in engineering units with all the compensations applied; improving the integrity of the data through error checking in the field bus protocol; removing the requirement to update the control system code when replacing the load pin; leveraging the same wiring (service loop) as currently in place; providing field bus communications that can be used either in place of or in addition to a robust wireless communication technology from the load cell as well; and/or using the same load pin housing design as in use today, by allowing additional electronics to be fitted in the existing cavity of the load cell or installed or installed immediately outside and adjacent to the load cell.

According to one embodiment, a method for controlling a draw-works system may include measuring, with a load pin, a load on a hook of a draw-works system; converting, with the load pin, the measured load to a digital value representative of the measured load, wherein the digital value represents the value of the measured load in engineering units; transferring, from the load pin, the digital value representative of the measured load to a control system located at a derrick; and/or adjusting, with the control system, operation of the draw-works system based, at least in part, on the received digital value representative of the measured load.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

The smart pin relieves the control system of interpreting the hook load by sending a pre-scaled, pre-calibrated load signal via digital data (such as over a field bus). This signal now becomes a "pass-through" value and can use standard conversion methods to display the hookload. In addition to strain measurements, additional instrumentation is installed in the load pin and multiplexed on the communications protocol with the strain measurements. One example is the inclusion of an inertial measurement unit (IMU). There are many applications of IMUs in spatial measurement of block motion, but from the perspective of the strain sensing this would help further identify and model asymmetrical loading across pairs of load pins. If the reported pin loads are not reasonably equivalent, this could be attributed to asymmetrical loading of the equipment on the pins. One of the causes of this could be as a result of misalignment of the travelling equipment.

Figure 2:
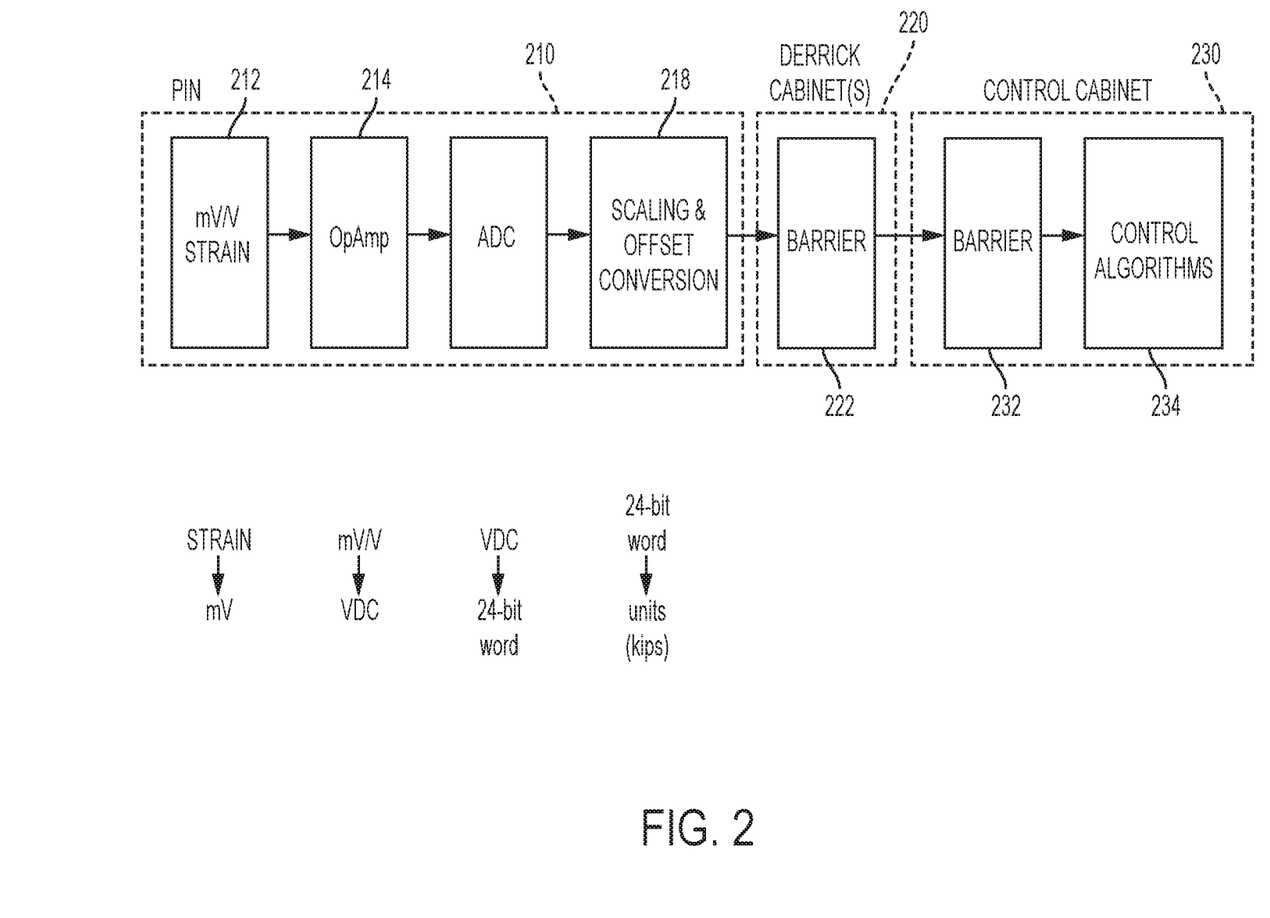
FIG. 2 is a block diagram illustrating a processing path and steps for transmitting, from a smart load pin, the hookload signal from the measurement to the control system according to one embodiment of the disclosure.
Figure 3A:
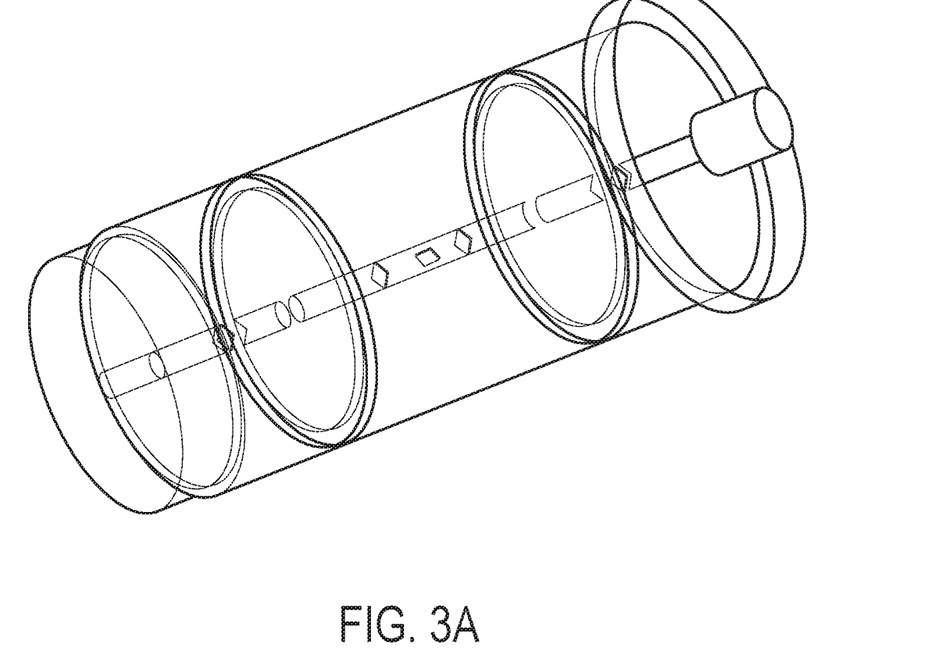
FIGS. 3A and 3B are a three-dimensional rendering of a becket pin load cell with smart instrumentation, including squares representing strain sensors showing an approximate but not limiting position, according to one embodiment of the disclosure.
Figure 3B:
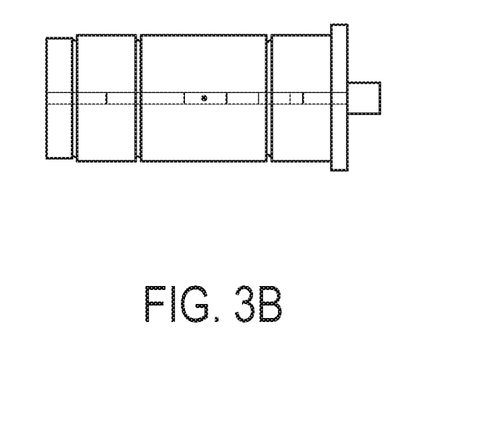

FIG. 2 illustrates an example of an internally instrumented load pin for drilling applications. FIG. 2 is a block diagram illustrating a processing path and steps for transmitting, from a smart load pin, the hookload signal from the measurement to the control system according to one embodiment of the disclosure. A load pin 210 may include a strain sensor 212, an operational amplifier 214, an analog-to-digital converter (ADC) 216, and a scaling and offset conversion block 218. The load pin 210 is shown in more detail in FIGS. 3A and 3B. FIGS. 3A and 3B are a three-dimensional rendering of a becket pin load cell with smart instrumentation, including squares representing strain sensors showing an approximate but not limiting position, according to one embodiment of the disclosure. Referring back to FIG. 2, strain may be converted by the sensor 212 into a millivolts signal and processed in the load pin 210 to a signal corresponding to engineering units (such as kips). That engineering units signal may be processed in a barrier 222 of derrick cabinet(s) 220, and barrier 232 and controller 234 of control cabinet 230. In other embodiments, the amplifier 214, ADC 216, and scaling and offset conversion block 218 may be implemented in a processor for executing code configured to perform steps that accomplish similar tasks as the operational amplifier 214, the analog-to-digital converter (ADC) 216, and the scaling and offset conversion block 218.

Figure 4:
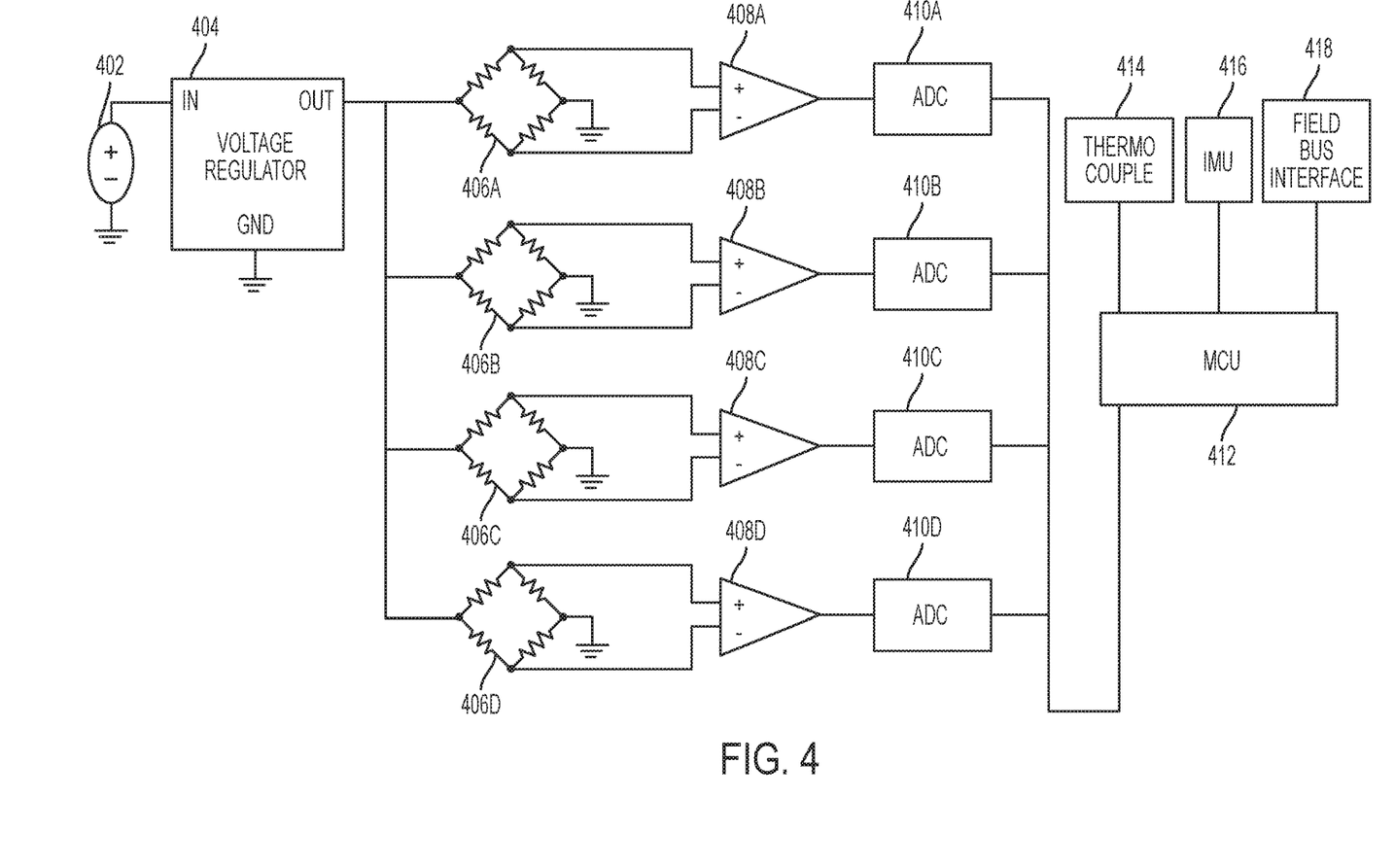
FIG. 4 is a circuit diagram illustrating an electrical layout for signal processing involving measurements from the load pin according to one embodiment of the disclosure.

One circuit design for such a smart pin as the pin 210 of FIG. 2 is illustrated in FIG. 4. A voltage regulator 404 may be used to provide a stable voltage for source power for integrated circuits (ICs) onboard the smart pin. Op-amps 408A-D (instrumentation operational amplifier) may be applied to the mV/V signal for amplification of the signal received from Wheatstone bridges 406A-D, and a reference voltage may be measured as well. A thermocouple 414 may monitor a temperature of the smart load pin and provide the processor (such as a controller) 412 with the ability to compensate for these thermal variations. An inertial motion unit (IMU) 416 may provide multiple degrees of freedom for pose measurement. A fieldbus communication interface 418 may be used by the processor 412 to transfer data to the control system or directly to an instrumentation device/network.

One location for a smart load pin is on a cable within a service loop having the least impact on our signal. Further, the load pin may include various shielding and insulation based on the environment. In addition, various baud rates may be used in transmitting data packets to find sufficient accuracy. Further, forward error correction or channel coding may be applied to data to control errors in data transmission.

In one embodiment, the processor 412 may be an MCU. Many of the critical measurements provided to the MCU 412 may pass through a dedicated ADC, although alternatively an integrated ADC for auxiliary measurements may be included. In one embodiment, the dimensions of the board for the MCU may be smaller that approximately 19 mm and be capable of operating in a temperature range of −40 C.→100 C. Further, communication to the MCU 412 may use I2C and/or SPI protocols, and a debugging port such as JTAG may be included.

Figure 5:
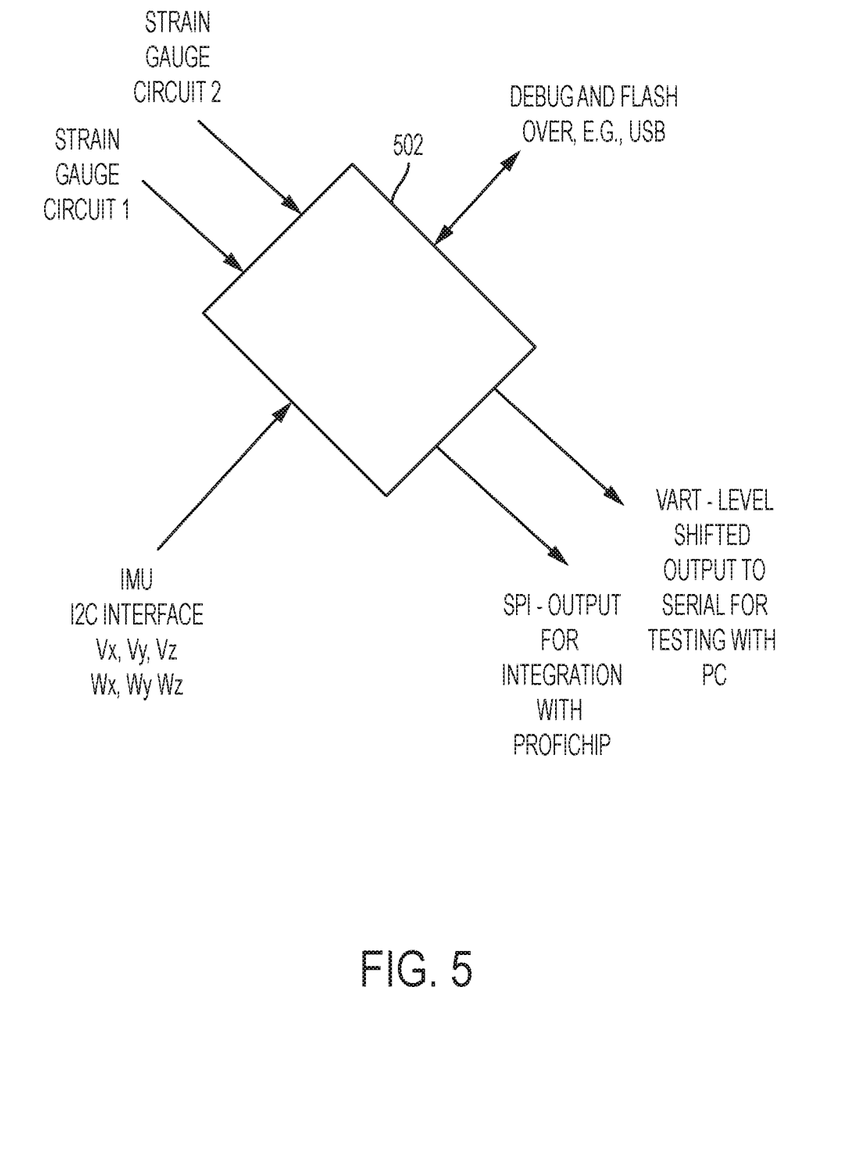
FIG. 5 is a block diagram illustrating primary interfaces for a processor to interface with strain measurement devices according to one embodiment of the disclosure.

FIG. 5 is a block diagram illustrating interfaces for a processor to interface with strain measurement devices according to one embodiment of the disclosure. A processor 502 may receive data from one or more strain gauge circuits, which may be integrated in smart load pins. The processor 502 may also receive data from an IMU or other components over an I2C interface, including data such as Vx, Vy, Vz, Wx, Wy, and Wz vector values. The processor 502 may compute values to output to a UART level-shifted output serial data for testing or further processing with another processor or controller and to output SPI-output for integration with a Profichip. Further, the processor 502 may include an interface for transmitting debug information and receiving new flash programming, such as over a USB bus.

Figure 6:
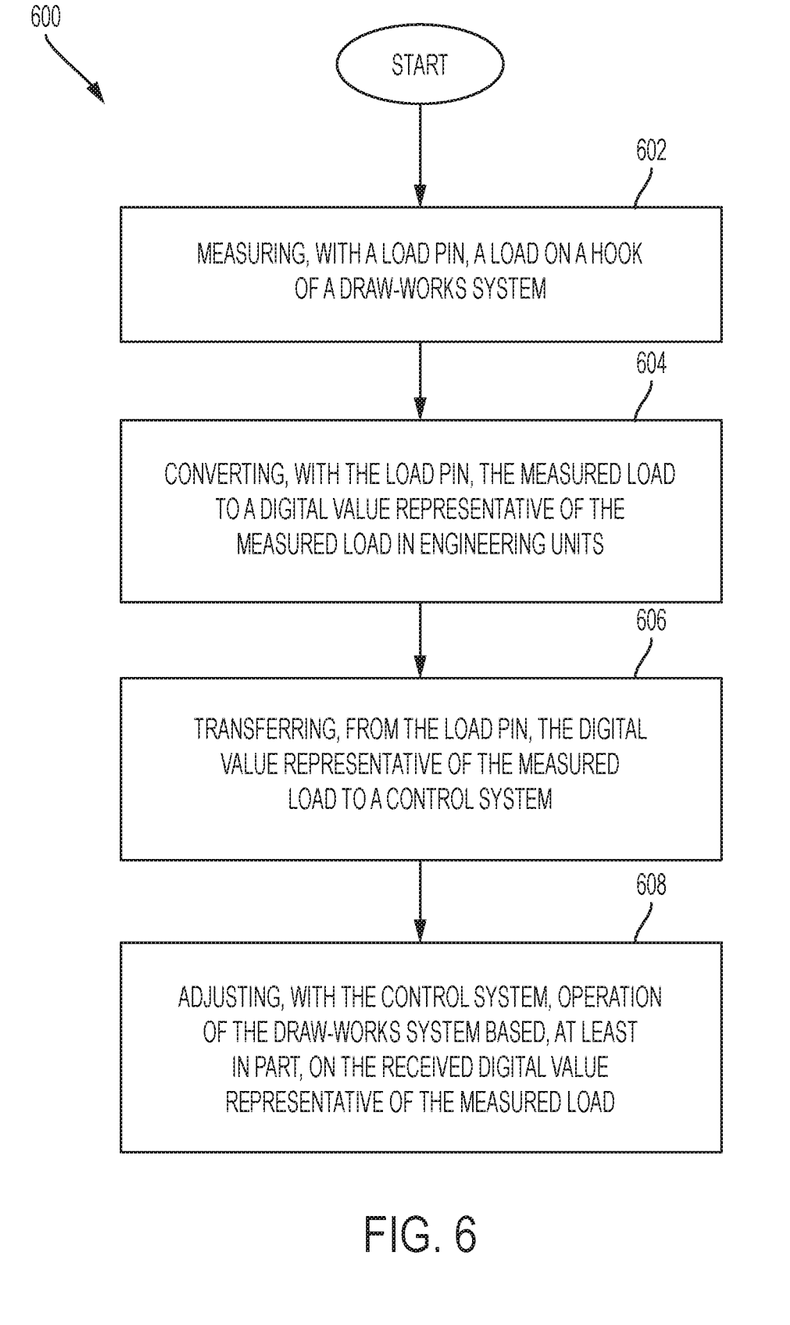
FIG. 6 is a flow chart illustrating a method of controlling a drill-works system with input from a smart load pin according to one embodiment of the disclosure.

FIG. 6 is a flow chart illustrating a method of controlling a drill-works system with input from a smart load pin according to one embodiment of the disclosure. A method 600 begins at block 602 with measuring, with a load pin, a load on a hook of a draw-works system. Then, at block 604, the method 600 continues with converting, with the load pin, the measured load to a digital value representative of the measured load, wherein the digital value represents the value of the measured load in engineering units. Next, at block 606, the method 600 continues with transferring, from the load pin, the digital value representative of the measured load to a control system located at a derrick. Then, at block 608, the method 600 may further include adjusting, with the control system, operation of the draw-works system based, at least in part, on the received digital value representative of the measured load The schematic flow chart diagram of FIG. 2 and FIG. 6 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for controlling a draw-works system, comprising:
   measuring, with a load pin, a load on a hook of a draw-works system;
   converting, with the load pin, the measured load to a digital value representative of the measured load, wherein the digital value represents the value of the measured load, and wherein converting comprises:
      converting, with a transducer strain gauge of the load pin, the measured load to an analog voltage representative of the measured load;
      converting, with an analog-to-digital converter of the load pin, the analog voltage representative of the measured load to a digital value; and
      compensating, with an MCU of the load pin, the digital value to account for known variations in the measurement of the load; and
   transferring, from the load pin, the compensated digital value representative of the measured load to a control system located at a derrick.

2. The method of claim 1, further comprising adjusting, with the control system, operation of the draw-works system based, at least in part, on the received digital value representative of the measured load.

3. The method of claim 1, wherein the measured load is represented as a tension value.

4. The method of claim 1, wherein the load pin is coupled to at least one of a traveling block, a drilling hook, and a top drive of the draw-works system.

5. The method of claim 1, wherein transferring comprises transferring the digital value via at least one of a physical communications bus and a wireless communication system.

6. The method of claim 1, wherein the step of compensating the digital value to account for known variations in the measurement of the load comprises compensating the digital value for thermal variations in the analog voltage representative of the measured load, wherein the step of compensating the digital value for thermal variations is based, at least in part, on a temperature value received from a thermocouple integrated with the load pin.

7. A load pin, comprising:
   a strain sensor for measuring a load on a hook of a draw-works system; and
   electronic circuitry coupled to the strain sensor and configured to perform steps comprising:
      converting the measured load to an analog voltage representative of the measured load;

converting the analog voltage representative of the measured load to a digital value;
compensating the digital value to account for known variations in the measurement of the load; and
transferring, from the load pin, the compensated digital value representative of the measured load to a control system located at a derrick.

8. The load pin of claim 7, wherein the electronic circuitry comprises:
an operational amplifier coupled to the strain sensor; and
an analog-to-digital converter (ADC) coupled to the operational amplifier.

9. The load pin of claim 8, wherein the electronic circuitry is further configured to perform steps comprising scaling and offset conversion of an output of the analog-to-digital converter (ADC).

10. The load pin of claim 7, wherein the load pin is configured to be coupled to at least one of a traveling block, a drilling hook, and a top drive of the draw-works system.

11. The load pin of claim 7, wherein transferring comprises transferring the digital value via at least one of a physical communications bus and a wireless communication system.

12. The load pin of claim 7, wherein the electronic circuitry is configured to perform the step of compensating the digital value to account for known variations by compensating the digital value for thermal variations in the analog voltage representative of the measured load, wherein the load pin further comprises a thermocouple, and wherein the electronic circuitry is configured to compensate for thermal variations based, at least in part, on a temperature value received from the thermocouple.

13. A computer program product, comprising:
a non-transitory computer readable medium comprising code to perform steps comprising:
receiving data regarding a load on a hook of a draw-works system;
converting the measured load to a digital value representative of the measured load, wherein the digital value represents the value of the measured load, and wherein the step of converting comprises:
converting the measured load to an analog voltage representative of the measured load;
converting the analog voltage representative of the measured load to a digital value; and
compensating the digital value to account for known variations in the measurement of the load; and
transferring the compensated digital value representative of the measured load from a load pin to a control system located at a derrick.

14. The computer program product of claim 13, wherein the measured load is represented as a tension value.

15. The computer program product of claim 14, wherein the tension value is measured from at least one of a traveling block, a drilling hook, and a top drive of the draw-works system.

16. The computer program product of claim 13, wherein transferring comprises transferring the digital value via at least one of a physical communications bus and a wireless communication system.

17. The computer program product of claim 13, wherein the medium further comprises code to perform steps comprising scaling and offset conversion of the measured load.

* * * * *